US007076445B1

(12) United States Patent
Cartwright

(10) Patent No.: US 7,076,445 B1
(45) Date of Patent: Jul. 11, 2006

(54) SYSTEM AND METHODS FOR OBTAINING ADVANTAGES AND TRANSACTING THE SAME IN A COMPUTER GAMING ENVIRONMENT

(76) Inventor: Shawn D. Cartwright, 149B N. 3rd St., Philadelphia, PA (US) 19106

( * ) Notice: Subject to any disclaimer, the term of this patent is extended or adjusted under 35 U.S.C. 154(b) by 19 days.

(21) Appl. No.: 09/676,448

(22) Filed: Sep. 29, 2000

Related U.S. Application Data

(60) Provisional application No. 60/212,749, filed on Jun. 20, 2000.

(51) Int. Cl.
*G06F 17/60* (2006.01)

(52) U.S. Cl. .............................. 705/14; 705/1; 705/26; 705/52

(58) Field of Classification Search .................... 705/1, 705/50, 51, 26, 27, 14
See application file for complete search history.

(56) References Cited

U.S. PATENT DOCUMENTS 5,166,886 A 11/1992 Molnar et al. .............. 364/479
5,497,479 A 3/1996 Hornbuckle ................ 395/491
5,509,070 A 4/1996 Schull ........................... 380/4
5,560,603 A 10/1996 Seelig et al.
5,624,316 A * 4/1997 Roskowski et al. ........... 463/45
5,625,690 A 4/1997 Michel et al. ................. 380/4
5,654,746 A * 8/1997 McMullan, Jr. et al. ........ 348/6
5,663,547 A 9/1997 Ziarno
5,664,998 A 9/1997 Seelig et al.
5,665,952 A 9/1997 Ziarno
5,694,546 A 12/1997 Reisman .................. 395/200.9
5,697,844 A 12/1997 Von Kohorn
5,708,709 A 1/1998 Rose ............................ 380/4
5,710,887 A * 1/1998 Chelliah et al. ............ 395/226
5,715,400 A * 2/1998 Reimer et al. ................ 705/27
5,745,886 A 4/1998 Rosen
5,752,238 A 5/1998 Dedrick
5,761,648 A * 6/1998 Golden et al. ................ 705/14
5,765,143 A 6/1998 Sheldon et al.
5,779,544 A 7/1998 Seelig et al.
5,794,210 A 8/1998 Goldhaber et al.
5,794,217 A 8/1998 Allen (Continued)

FOREIGN PATENT DOCUMENTS

EP 0780771 6/1997

(Continued)

OTHER PUBLICATIONS

EBSCO Host Research Database, http://web7.epnet.com/.*

(Continued)

*Primary Examiner*—Calvin L. Hewitt, II

(57) ABSTRACT

A system and methods allowing the creation, integration, and transaction of advantages (e.g. desired environment features and/or elements). In an illustrative implementation, the system may operate partially or completely in a computing environment. Where a computing environment is employed, the computing environment may support a computing application running on a stand alone or networked computing system. The computing application may maintain a user interface portion, a processing portion, and cooperate with a database. In operation, a user may register his/her profile information with an advantages content provider such that when navigating through the computing application, the user have access to and purchase offered advantages and interact with interactive advertisements to purchase products and/or services. The advantages may be retrieved from a cooperating database and provided to the user. A record of the transaction is stored by the computing application in accordance to user profile so that the user may be properly charged for the transacted advantages or purchased products and/or services.

19 Claims, 9 Drawing Sheets

U.S. PATENT DOCUMENTS 5,809,482 A 9/1998 Strisower
5,819,092 A 10/1998 Ferguson et al.
5,823,874 A 10/1998 Adams
5,825,883 A * 10/1998 Archibald et al. ............ 380/25
5,845,265 A 12/1998 Woolston
5,848,932 A 12/1998 Adams
5,855,006 A 12/1998 Huemoeller et al.
5,855,008 A 12/1998 Goldhaber et al.
5,873,068 A 2/1999 Beaumont et al.
5,875,437 A 2/1999 Atkins
5,876,284 A 3/1999 Acres et al.
5,878,139 A 3/1999 Rosen
5,882,261 A 3/1999 Adams
5,884,029 A * 3/1999 Brush et al. ................ 709/202
5,890,135 A 3/1999 Powell
5,894,320 A * 4/1999 Vancelette .................. 725/138
5,895,454 A 4/1999 Harrington
5,903,652 A 5/1999 Mital
5,903,874 A 5/1999 Leonard et al.
5,907,275 A 5/1999 Battistini et al.
5,907,617 A 5/1999 Ronning ........................ 380/4
5,907,831 A 5/1999 Lotvin et al.
5,915,019 A 6/1999 Ginter et al.
5,915,243 A 6/1999 Smolen
5,916,924 A 6/1999 Sasaki et al.
5,917,912 A 6/1999 Ginter et al.
5,918,213 A 6/1999 Bernard et al.
5,933,811 A 8/1999 Angles et al.
5,940,805 A 8/1999 Kopp
5,948,040 A 9/1999 DeLorme et al.
5,949,876 A 9/1999 Ginter et al.
5,956,038 A * 9/1999 Rekimoto ................... 345/419
5,960,406 A 9/1999 Rasansky et al.
5,963,914 A 10/1999 Skinner et al.
5,964,660 A 10/1999 James et al.
5,970,143 A * 10/1999 Schneier et al. .............. 380/23
5,970,470 A 10/1999 Walker et al.
5,970,479 A 10/1999 Shepherd
5,974,454 A * 10/1999 Apfel et al. ................ 709/221
5,980,384 A 11/1999 Barrie
5,982,891 A 11/1999 Ginter et al.
5,983,196 A 11/1999 Wendkos et al.
5,987,430 A 11/1999 Van Horne et al.
5,991,747 A 11/1999 Tomoyuki et al.
6,003,013 A 12/1999 Boushy et al.
6,003,014 A 12/1999 Lee et al.
6,003,021 A 12/1999 Zadik et al.
6,009,410 A 12/1999 LeMole et al.
6,012,982 A 1/2000 Piechowiak et al.
6,014,651 A 1/2000 Crawford .................... 705/400
6,018,717 A 1/2000 Lee et al.
6,018,720 A 1/2000 Fujimoto
6,018,724 A 1/2000 Arent
6,024,572 A 2/2000 Weyer
6,026,381 A 2/2000 Barton, III et al.
6,036,601 A * 3/2000 Heckel ........................ 463/42
6,044,360 A 3/2000 Picciallo
6,049,778 A 4/2000 Walker et al.
6,049,779 A 4/2000 Berkson
6,055,518 A 4/2000 Franklin et al.
6,058,379 A 5/2000 Odom et al.
6,061,660 A 5/2000 Eggleston et al.
6,067,532 A 5/2000 Gebb
6,071,191 A 6/2000 Takeda et al.
6,073,124 A 6/2000 Krishnan et al.
6,078,901 A 6/2000 Ching
6,078,906 A 6/2000 Huberman
6,081,790 A 6/2000 Rosen
6,085,176 A 7/2000 Woolston
6,085,178 A 7/2000 Bigus et al.
6,089,976 A 7/2000 Schneider et al.
6,089,978 A 7/2000 Adams
6,112,181 A 8/2000 Shear et al.
6,119,096 A 9/2000 Mann et al.
6,119,099 A 9/2000 Dancyger et al.
6,119,229 A * 9/2000 Martinez et al. ............ 713/200
6,128,601 A 10/2000 Van Horne et al.
6,131,085 A 10/2000 Rossides
6,134,536 A 10/2000 Shepherd
6,139,433 A 10/2000 Miyamoto et al.
6,139,434 A 10/2000 Miyamoto et al.
6,141,010 A * 10/2000 Hoyle ........................ 715/854
6,144,946 A 11/2000 Iwamura
6,146,273 A 11/2000 Olsen
6,154,731 A 11/2000 Monks et al.
6,155,926 A 12/2000 Miyamoto et al.
6,157,377 A * 12/2000 Shah-Nazaroff et al. .... 345/719
6,163,772 A 12/2000 Kramer et al.
6,169,976 B1 1/2001 Colosso
6,178,407 B1 1/2001 Lotvin et al.
6,178,409 B1 1/2001 Weber et al.
6,179,713 B1 1/2001 James et al.
6,190,257 B1 2/2001 Takeda et al.
6,199,046 B1 3/2001 Heinzle et al.
6,202,051 B1 3/2001 Woolston
6,205,436 B1 3/2001 Rosen
6,208,974 B1 3/2001 Campbell et al.
6,208,976 B1 3/2001 Kinebuchi et al.
6,216,110 B1 4/2001 Silverberg
6,216,111 B1 4/2001 Walker et al.
6,223,165 B1 4/2001 Lauffer
6,226,618 B1 5/2001 Downs et al.
6,233,564 B1 5/2001 Schulze, Jr.
6,233,566 B1 5/2001 Levine et al.
6,233,567 B1 5/2001 Cohen
6,236,971 B1 5/2001 Stefik et al.
6,236,977 B1 5/2001 Verba et al.
6,236,979 B1 5/2001 Kawabata
6,240,396 B1 5/2001 Walker et al.
6,240,397 B1 5/2001 Sachs
6,244,959 B1 6/2001 Miyamoto et al.
6,253,193 B1 6/2001 Ginter et al.
6,260,019 B1 7/2001 Courts
6,263,313 B1 7/2001 Milsted et al.
6,266,647 B1 7/2001 Fernandez
6,266,651 B1 7/2001 Woolston
6,267,673 B1 7/2001 Miyamoto et al.
6,283,857 B1 9/2001 Miyamoto et al.
6,324,525 B1 11/2001 Kramer et al.
6,327,569 B1 12/2001 Reep
6,327,570 B1 12/2001 Stevens
6,327,573 B1 12/2001 Walker et al.
6,331,146 B1 12/2001 Miyamoto et al.
6,334,118 B1 12/2001 Benson
6,336,095 B1 1/2002 Rosen
6,339,765 B1 1/2002 Maher
6,343,284 B1 1/2002 Ishikawa et al.
6,345,256 B1 2/2002 Milsted et al.
6,363,363 B1 3/2002 Haller et al.
6,363,364 B1 3/2002 Nel
6,374,228 B1 4/2002 Litwin
6,383,079 B1 5/2002 Takeda et al.
6,385,590 B1 5/2002 Levine
6,385,592 B1 * 5/2002 Angles et al. ................ 705/14
6,393,409 B1 5/2002 Young et al.
6,394,905 B1 5/2002 Takeda et al.
6,418,417 B1 7/2002 Corby et al.
6,418,421 B1 7/2002 Corby et al.
6,427,140 B1 7/2002 Ginter et al.
6,446,045 B1 9/2002 Stone et al.
6,453,299 B1 9/2002 Wendkos
6,454,652 B1 9/2002 Miyamoto et al.
6,473,739 B1 10/2002 Showghi et al.
6,473,740 B1 10/2002 Cockrill et al.

6,484,148 B1 11/2002 Boyd
6,493,682 B1 12/2002 Horrigan et al.
6,496,808 B1 12/2002 Aiello et al.
6,505,174 B1 1/2003 Keiser et al.
6,519,571 B1 2/2003 Guheen et al.
6,523,010 B1 2/2003 Lauffer
6,532,448 B1 3/2003 Higginson et al.
6,571,216 B1 5/2003 Garg et al.
6,571,221 B1 5/2003 Stewart et al.
6,574,609 B1 6/2003 Downs et al.
6,578,008 B1 6/2003 Chacker
6,581,039 B1 6/2003 Marpe et al.
6,581,044 B1 6/2003 Alur
6,587,835 B1 7/2003 Treyz et al.
6,587,837 B1 7/2003 Spagna et al.
6,591,250 B1 7/2003 Johnson et al.
6,594,640 B1 7/2003 Postrel
6,598,024 B1 7/2003 Walker et al.
6,609,113 B1 8/2003 O'Leary et al.
6,611,812 B1 8/2003 Hurtado et al.
6,616,533 B1* 9/2003 Rashkovskiy ................ 463/31
6,629,081 B1 9/2003 Cornelius et al.
6,631,359 B1 10/2003 Braitberg et al.
6,671,675 B1 12/2003 Iwamura
6,741,967 B1 5/2004 Wu et al.
6,775,655 B1 8/2004 Peinado et al.
6,785,659 B1 8/2004 Landsman et al.
6,801,899 B1 10/2004 Lauffer
6,807,534 B1 10/2004 Erickson
6,820,061 B1 11/2004 Postrel
6,820,063 B1 11/2004 England et al.
6,829,586 B1 12/2004 Postrel
6,829,587 B1 12/2004 Stone et al.
6,829,595 B1 12/2004 Justice
6,834,269 B1 12/2004 Bueche
6,834,272 B1 12/2004 Naor et al.
6,836,765 B1 12/2004 Sussman
6,839,680 B1 1/2005 Liu et al.
6,842,737 B1 1/2005 Stiles et al.
6,842,739 B1 1/2005 Postrel
6,847,950 B1 1/2005 Kamibayashi et al.
6,850,901 B1 2/2005 Hunter et al.
6,850,909 B1 2/2005 Aiello et al.
6,856,966 B1 2/2005 Fujimoto
6,856,967 B1 2/2005 Woolston et al.
6,856,968 B1 2/2005 Cooley et al.
6,856,975 B1 2/2005 Woolston et al.
6,859,791 B1 2/2005 Spagna et al.
6,865,551 B1 3/2005 Stefik et al.
6,868,394 B1 3/2005 Mele
6,868,403 B1 3/2005 Wiser et al.
6,871,192 B1 3/2005 Fontana et al.
6,873,969 B1 3/2005 Stone et al.
6,873,970 B1 3/2005 Showghi et al.
6,879,965 B1 4/2005 Fung et al.
6,882,985 B1 4/2005 Kay et al.
6,889,209 B1 5/2005 Rabin et al.
6,895,394 B1 5/2005 Kremer et al.
6,898,576 B1 5/2005 Stefik et al.
6,901,375 B1 5/2005 Fernandez
6,901,383 B1 5/2005 Ricketts et al.
6,904,410 B1 6/2005 Weiss et al.
6,907,400 B1 6/2005 Matsko et al.
6,907,405 B1 6/2005 Brett
6,910,022 B1 6/2005 Stefik et al.
6,912,503 B1 6/2005 Quarendon et al.
6,912,510 B1 6/2005 Shepherd
6,915,269 B1 7/2005 Shapiro et al.
6,915,272 B1 7/2005 Zilliacus et al.
6,920,431 B1 7/2005 Showgi et al.
6,920,436 B1 7/2005 Stefik et al.
6,922,720 B1 7/2005 Cianciarulo et al.
6,925,448 B1 8/2005 Stefik et al.
6,925,469 B1 8/2005 Headings et al.
6,928,413 B1 8/2005 Pulitzer
6,928,414 B1* 8/2005 Kim ........................... 705/14
6,928,419 B1 8/2005 Stefik et al.
6,928,420 B1 8/2005 Kurihara et al.
6,934,692 B1 8/2005 Duncan
6,934,693 B1 8/2005 Stefik et al.
6,937,993 B1 8/2005 Gabbita et al.
6,937,997 B1 8/2005 Parulski
6,938,021 B1 8/2005 Shear et al.
6,938,244 B1 8/2005 Perlin et al.
6,941,270 B1 9/2005 Hannula
6,941,353 B1 9/2005 Lane
6,942,569 B1 9/2005 Petracca
6,944,596 B1 9/2005 Gray et al.
6,944,600 B1 9/2005 Stefik et al.
6,944,632 B1 9/2005 Stern
2001/0044339 A1 11/2001 A. Cordero et al.
2001/0046896 A1 11/2001 Miyamoto et al.
2002/0082065 A1 6/2002 Fogel et al.
2002/0082077 A1 6/2002 Johnson et al.
2002/0115486 A1 8/2002 Miyamoto et al.
2002/0193162 A1 12/2002 Walker et al.
2003/0078102 A1 4/2003 Okita et al.
2003/0125103 A1 7/2003 Tessmer et al.
2004/0053690 A1 3/2004 Fogel et al.
2004/0148221 A1 7/2004 Chu
2004/0177007 A1 9/2004 Van Luchene
2004/0181456 A1 9/2004 K. Matsumori
2005/0045025 A1 3/2005 Wells et al.
2005/0080727 A1 4/2005 Postrel
2005/0080911 A1 4/2005 Stiers et al.
2005/0083877 A1 4/2005 Zilliacus et al.
2005/0085294 A1 4/2005 Walker et al.
2005/0085295 A1 4/2005 Walker et al.
2005/0086126 A1 4/2005 Patterson
2005/0086585 A1 4/2005 Robert et al.
2005/0091133 A1 4/2005 Ballman
2005/0092839 A1 5/2005 Oram
2005/0096114 A1 5/2005 Cannon et al.
2005/0096116 A1 5/2005 Mindes
2005/0096121 A1 5/2005 Gilliland et al.
2005/0096123 A1 5/2005 Cregan et al.
2005/0096127 A1 5/2005 Dabrowski
2005/0096133 A1 5/2005 Hoefaimeyer et al.
2005/0096134 A1 5/2005 L. Lippincott
2005/0096841 A1 5/2005 Gedik et al.
2005/0096975 A1 5/2005 Moshe
2005/0102178 A1 5/2005 Phillips et al.
2005/0102188 A1 5/2005 Hutchison et al.
2005/0102199 A1 5/2005 Lee
2005/0102211 A1 5/2005 Freeny
2005/0102215 A1 5/2005 Ausubel et al.
2005/0102216 A1 5/2005 Ballman
2005/0102329 A1 5/2005 Jiang et al.
2005/0102374 A1 5/2005 Moragne et al.
2005/0102381 A1 5/2005 Jiang et al.
2005/0102638 A1 5/2005 Jiang et al.
2005/0105731 A1 5/2005 Basquin
2005/0107152 A1 5/2005 McGee et al.
2005/0107155 A1 5/2005 Potts et al.
2005/0108090 A1 5/2005 Takada et al.
2005/0108127 A1 5/2005 Brown et al.
2005/0108144 A1 5/2005 Longman et al.
2005/0108252 A1 5/2005 Pfaltz
2005/0108563 A1 5/2005 Becker et al.
2005/0110690 A1 5/2005 Ko et al.
2005/0113162 A1 5/2005 Olive et al.
2005/0116951 A1 6/2005 Stephenson
2005/0119934 A1 6/2005 Kamlyama
2005/0120221 A1 6/2005 Arnold et al.
2005/0120868 A1 6/2005 Hinman et al.
2005/0124406 A1 6/2005 Cannon 2005/0125328 A1 6/2005 Schluetter
2005/0125363 A1 6/2005 Wilson et al.
2005/0129187 A1 6/2005 Agapi et al.
2005/0132420 A1 6/2005 Howard et al.
2005/0137963 A1 6/2005 Ricketts
2005/0138158 A1 6/2005 Challener
2005/0138560 A1 6/2005 Lee et al.
2005/0138656 A1 6/2005 Moore et al.
2005/0141525 A1 6/2005 Rose
2005/0144068 A1 6/2005 Calabria et al.
2005/0144115 A1 6/2005 Brett
2005/0146745 A1 7/2005 Umehara
2005/0148384 A1 7/2005 Marks et al.
2005/0149394 A1 7/2005 Postrel
2005/0149454 A1 7/2005 Chen et al.
2005/0149855 A1 7/2005 Loo et al.
2005/0151722 A1 7/2005 Meteyer
2005/0153759 A1 7/2005 Varley
2005/0153760 A1 7/2005 Varley
2005/0153779 A1 7/2005 Ziegler
2005/0154804 A1 7/2005 Stewart et al.
2005/0155063 A1 7/2005 Bayrakeri et al.
2005/0157217 A1 7/2005 Hendricks
2005/0159203 A1 7/2005 Bond et al.
2005/0159213 A1 7/2005 Okada et al.
2005/0159220 A1 7/2005 Wilson et al.
2005/0162439 A1 7/2005 Bates et al.
2005/0163361 A1 7/2005 Jones et al.
2005/0164780 A1 7/2005 Okada et al.
2005/0165637 A1 7/2005 Mayerhofer
2005/0166064 A1 7/2005 Dive-Reclus et al.
2005/0170876 A1 8/2005 Masci et al.
2005/0170880 A1 8/2005 Walker et al.
2005/0170885 A1 8/2005 Poole et al.
2005/0171847 A1 8/2005 Ling
2005/0171903 A1 8/2005 Yacobi et al.
2005/0171904 A1 8/2005 Yacobi et al.
2005/0173519 A1 8/2005 Gatto
2005/0177417 A1 8/2005 Korayasu
2005/0177427 A1 8/2005 Mount et al.
2005/0177519 A1 8/2005 Block
2005/0177859 A1 8/2005 Valentino et al.
2005/0178829 A1 8/2005 Rosenberg
2005/0181796 A1 8/2005 Kumar et al.
2005/0181858 A1 8/2005 Caro et al.
2005/0181860 A1 8/2005 Nguyen et al.
2005/0182589 A1 8/2005 Smocha et al.
2005/0182681 A1 8/2005 Bruskotter et al.
2005/0182687 A1 8/2005 Godfrey
2005/0185638 A1 8/2005 Begis
2005/0192071 A1 9/2005 Matsuno et al.
2005/0192081 A1 9/2005 Marks et al.
2005/0192800 A1 9/2005 Thyssen
2005/0193015 A1 9/2005 Logston et al.

FOREIGN PATENT DOCUMENTS

EP 00875816 11/1998
EP 1125617 8/2001
GB 2141907 A * 1/1985
JP 01236308 9/1989
JP 04272917 9/1992
WO 2001001304/WO 1/2001
WO 2001065358/WO 9/2001
WO 2003094119/WO 1/2003
WO 2003029936/WO 4/2003
WO 2005044412/WO 5/2005

OTHER PUBLICATIONS

Internet Archive Wayback Machine, http://web.archive.org/web/1996051219457/http://www.happypuppy.com/.*
"MICROSOFT: Key players tap Microsoft DirectPlay to deliver online gaming to the masses" M2 PressWire, Apr. 29, 1997.*
GameShark Webpage, "About GameShark," InterAct Accessories, Inc., Copyright © 2000, Jun. 14, 2000, 3 pages.
Cheat Codes 2000 Webpage, "Cheat Codes 2000: Main Index," Copyright © 1994-2000, Yahoo! Inc., Jun. 12, 2000, 1 page.
Cheatcc.com Webpage, "Cheat Codes," Copyright © 1994-2000, Yahoo! Inc., Jun. 12, 2000, 2 pages.
GameSages Webpage, "GameSages—The Cure for the Common Code," Snowball.com, Inc., Copyright © 2000, Jun. 12, 2000, 4 pages.
"Freaky Cheats, wysiwyg://142/http://www.freaky-cheats.com/index2.asp," *Leviathan Press*, May 31, 2000, 3 pages.
Martini, A., et al., "Cyberguide:games—Happy Puppy Cheats & Hints," *NetGuide*, May 1996, 3(5), 4 pages.
Nerac Question 10588883.293.
Digital Coints (Electronic Coins) (Includes Related Article on Coins Through History) (Internet/Web/Online Serivce Information); Computer Life.
Nerac Question 10588883.294.
Cybercash Enlists M3 Group to Woo Online Game Publishers; Newsbytes News Network.
Atari, Chuck E. Cheese Founder Unveils His Latest Project; San Jose Mercury News.
Cybercash & Rocket Science Pay-As-You-Play Online Arcade Feb. 13, 1996; Newsbytes News Network.
Sun, Kabira Work on Transaction Back End; SD Times.
Segasoft to Introduce Arcade-Like Revenue Stream After Heat.Net Launch; Multimedia Wire.
Nerac Question 105888883.295.
Microsoft Sees Blogs for the Masses; Company's Online Journal Tool Debuts; Seattle Post-Intelligencer.
Internet Technology Technology/Electronic Commerce—Industry Report; Painewebber, Inc.
Banking: Italy—International Electronic Conmmerce; Datamonitor.
Banking: UK—International Electronic Commerce; Datamonitor.
Microsoft Reveals First Detail of Next-Generation Xbox; Newswire.
Traction Software Internationalizes Enterprise Weblog Platform With Release 3.0; Newswire.
Handango Technology Unveils Application Management & Provisioning Platform (AMPP); Mobile Software Leader Launches Platform Built on its Commercially Proven, Market-Leading . . . ; Newwire.
Strategic Technology Series From Microsoft Press Helps Executives and Entrepreneurs Plan for the Future of Business Computing; Newswire.
Nerac Question 10588883.295 (Continued).
Entertainment: Next Xbox Includes a Marketplace; Wall Street Journal.
Pixel Technologies' Announces the Availability of MobilePlay1, The First Full Multiplayer Games Package Available for Windows Powered Devices; M2 Presswire.
Microsoft Reveals First Details of Next-Generation Xbox; PRNewsire.
Tandem Scales Himalayas; UNIX News.
Microsoft Plunges Into Electronic Commerece With HP's Verifone Inc; Computergram International.
Telecoms: Deutsche Telekom AG and Microsoft Corp Have Signed a Broad Reaching Agreement; Network Briefing.
Microsoft Deal Gives On-Line Payment Firm U.S. Foothold; American Banker.

GC Tech's Globid Payment Internet Commerce Software Supports Microsoft Merchant Server; Business Wire.
Quick Hits: Report Addresses 'Global Copyright Pandemic' (Briefs) (Microsoft Corp. Acquirefrontbridge Technologies) (Yahoo! Has Partnered With Connexion) (Mar. Ex . . . ): B to B.
Microsoft Bets $15M on Maker of Micropayment Technology (Invests in Micropayment Company Reciprocal) (Company Business And Marketing): Internet World.
Honey, What's Microsoft Doing on our Phone? (Microsoft a Customer Of Echarge) (Company Business and Marketing) (Company Business and Marketing) (Brief Article); Internet World.
E-Commerce Push. (Microsoft's Merchant Server Electronic Commerce System) (Product Development); CommunicationsWeek.

* cited by examiner

SYSTEM AND METHODS FOR OBTAINING ADVANTAGES AND TRANSACTING THE SAME IN A COMPUTER GAMING ENVIRONMENT

PRIORITY

This application is related to and claims priority under 35 U.S.C. § 119(e) to U.S. Provisional Patent Application Ser. No. 60/212,749, filed Jun. 20, 2000, entitled "SYSTEM AND METHODS FOR OBTAINING ADVANTAGES AND TRANSACTING THE SAME", the contents of which are hereby incorporated by reference in their entirety.

FIELD OF THE INVENTION

The present invention relates generally to the creation, integration, and transaction of advantages. Particularly, the present invention relates to the creation, integration, and transaction of advantages in non-computing, partial-computing, and computing environments, and more particularly, to providing a system and methods for the creation, integration, and transaction of advantages in non-computing, partial-computing, and computing environments that provide participating users the ability to obtain advantages at will.

BACKGROUND OF THE INVENTION

Today, we face many challenges in our daily lives that demand the expenditure of valuable resources. These challenges can be more easily disposed with the aid of advantages. Generally, an advantage is a feature or element within an environment that one is not intended to have or does not normally have access to that provides an edge in overcoming a presented challenge. In the context of an observed environment, these advantages are environment features or elements that help to better navigate and exist within the observed environment.

Advantages are conventionally realized through rigorous physical and/or mental training, by employing advanced instruments, or, for the non-scrupulous, through bribery, cheating, and deception. The latter category has allowed for some significant events in our society today. For example, some ventures, and even some governments can base their existence on the capitalization of advantages. Subscribing to social conventions, the use of these advantages is traditionally kept secret in fear of retaliation, reprimand, and rebuke from non-sanctioning parties. Considering the benefits that may be realized from the use of advantages, if given the choice, most would employ advantages in their environments to assist them with their daily challenges.

Human nature dictates our need to achieve. This is apparent in the field of gaming. Gaming enthusiasts are willing to pay for the opportunity to obtain an advantage. This is especially the case where the player has spent a significant amount of time and energy in overcoming various challenges within the game to reach the desired goal of completing the game, but is unable to overcome a particular posed challenge. In such a circumstance, the player will likely be willing to pay for the ability to obtain an advantage or advantages to overcome this posed challenge. In recent years, gaming enthusiasts have enjoyed a number of action, action-adventure, adventure, and strategy games, such as, DOOM®, QUAKE®, AGE OF EMPIRES®, ULITMA ONLINE®, etc. The object of these games is to wage battle with various beings in an effort to win a war or improve your standing within the game and/or gaming community. These games are typically structured such that the player is given access to increasingly superior weaponry and/or skills as they advance through increasingly difficult game levels. It would be advantageous to gamers to have access to these superior weapons, or alternatively, additional ammunition for their existing weaponry, and/or superior skills earlier in the gaming experience.

The concept of obtaining advantages may be extended beyond the gaming context. For example, consumers may be willing to pay to obtain advantages, such as, procuring a more preferred seat on an airplane, train, or bus; or obtain additional golf strokes during a golf match. Further, the concept of obtaining advantages includes obtaining unfair advantages. An unfair advantage is generally a legally recognized advantage that confers an inequitable benefit to the requesting party (e.g. a person pays an additional "special" tax to a municipality and in turn receives a prime parking spot in the heart of the downtown municipality). Today, however, there are no comprehensive systems and methods for the creation, integration, and transaction of advantages. Interested participants are typically relegated to searching for free shortcuts and tricks (i.e. advantages) in on-line chat rooms and bulletin boards or to purchase and subscribe to publications. For example, in the gaming world, gamers may spend as much time and resources obtaining advantages as they do actually playing the games. Few advantages are contemplated, let alone offered to interested participants in non-computing and partial computing environments. Generally, interested participants are left to face obstacles in these environments without the aid of any advantage. For example, an interested participant, not afforded the sanctioned ability to speed in a rural community and is caught speeding, may have to pay a hefty fine and/or expend significant time and energy in challenging the speeding offense. As a result, the interested participant expends a great deal of resources to face obstacles that could otherwise be overcome.

From the foregoing it can be appreciated that there exists a need for comprehensive systems and methods that allow for the creation, integration, and transaction of advantages in computing, partial computing and non-computing environments. By providing a system and methods that allow for the creation, integration, and transaction of recognized and sanctioned advantages and unfair advantages, challenges may be more easily resolved freeing valuable resources.

SUMMARY OF THE INVENTION

The present invention is directed to providing systems and methods used to create, integrate, and transact various advantages in non-computing, partial computing, and interactive computing environments. These advantages comprise desired environment features or elements within a participating user's environment that are integrated within the environment. By integrating advantages, the present invention operates to facilitate the leveraging of advantages to participating users and offers advantage providers ensured exposure of their advantages.

In one illustrative implementation, the present invention may be realized through interactive computer applications supporting simulation and/or display. In this capacity, the invention is directed to a system and methods for identifying, creating, integrating, and transacting advantages to users of interactive computing applications. With this implementation, a participating user may obtain, in real time and upon payment of consideration, access to content, products, and/or services that are only offered to those users who have advanced or extended content, products, or services privileges. These advantages may be varied in form and content.

In operation, computing environment content providers may offer desired environment features or elements to participating users such that the desired environment features and/or elements are integrated within participating users' computing environments. These environment features and elements may be directly or indirectly associated with the scope of features or elements offered by the content providers. Using the present invention, participating users have the ability to "purchase" these environment features or elements using various currency means, including credit cards, e-cash, e-gold, other Internet enabled currency, and secondary monetary sources, such as, charges to phone or utility bill, transferring credit on pre-paid phone cards, or transit passes, or through conventional payment methods, such as checks, money-orders or cash. The participating user is allowed to exploit as few or all of the environment features and/or elements that are offered.

Another aspect of the illustrative implementation includes the ability to provide incentives to participating users such that the price of a desired environment feature and/or element becomes incrementally lower with increased purchase of offered environment features and/or elements. In the alternative, additional non-related environment features and/or elements may be offered to participating users with increased use. In an illustrative implementation, the participating user may receive his or her "N+1th" advantage for free with the confirmed purchase of "N" environment features and/or elements, or alternatively, the participating user may receive a real-world product, service, or securities with a significant number of environment feature and/or element purchases. Not only can advantage purchases offer increasing returns in terms of more advantages or real world products, but the purchases of real world products and services can offer increasing returns to advantages. For example, a participating user could receive a free advantage in return for purchasing a product or service. Participating users might also receive discounted advantages for revealing more information about themselves as a consumer. Conversely, the present invention contemplates offering credits to participating users for contributing already acquired environment features and/or elements.

Another aspect of the illustrative implementation includes the ability to integrate interactive advertisements that offer real world products and services to participating users navigating in a computer based environment. Stated differently, interactive advertisements are integrated within a participating user's environment such that a participating user, who is navigating in this cyber realm, may elect to purchase these products and services from the convenience of his/her computing environment without having to interface with other communication conventions. The transaction may be realized through a true two-way real time transaction system, allowing participating users to continue in their experience without the interruption of processing payment information. The computing environment may store a profile of the user so that key products and services may be offered in accordance to a user's profile. Further, the present invention contemplates a system wherein advertisers of products and services may obtain advantages over their competitors to better place their products and/or services to reach a larger audience.

Alternatively, in an illustrative non-computing application of the present invention, organizations or institutions may elect to offer and monetize non-computing environment features and/or elements (e.g. pay for the right to drive above the speed limit) by charging participating users fees for these environment features and/or elements. The implementation features are similar to those described for computer mediated environments where human interaction may replace the computer mediation in whole or in part.

Other features of the present invention are described below.

BRIEF DESCRIPTION OF THE DRAWINGS

A system and methods for the creation, integration, and transaction of advantages are further described with reference to the accompanying drawings in which.

DETAILED DESCRIPTION OF ILLUSTRATIVE IMPLEMENTATION

Figure 1:
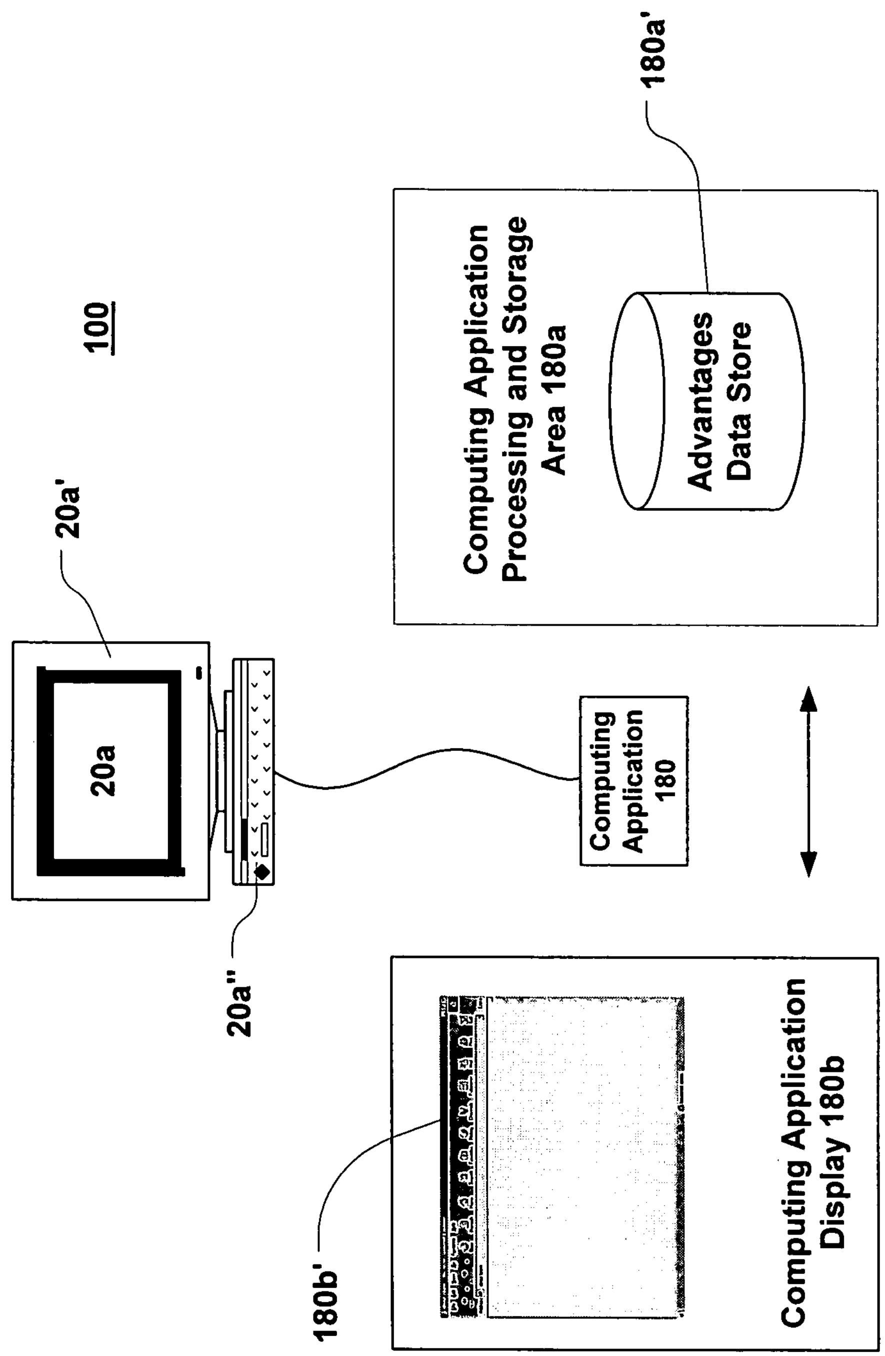
FIG. 1 is a system diagram of an exemplary computing environment in accordance with the present invention.

Overview:

Obtaining advantages is the process of acquiring something that one is not otherwise entitled to have. To date, society has been structured in such a manner to prevent its members from gaining such advantages. This structure has been implemented informally in society as a result of the development of culture, ethics, mores, and religious conventions. However, as time has passed, society has evolved to recognize benefits in providing sanctioned advantages. However, today the transaction of advantages is performed piecemeal and is very fragmented. A more comprehensive systems and methods would provide a centralized solution for the procurement and transaction of advantages.

Advantages may be offered and transacted for a variety of scenarios occurring in non-computing, partial-computing, and computing environments. Examples may include: online computer games; online entertainment and information; offline computer games; regular board games; sports; gambling; sales; services and queuing; employment (e.g. promotions, hiring, etc.); issuing permits; and securities and finance. By providing a system and methods for procuring and transaction advantages, participating users may be afforded the ability to efficiently achieve sought after advantages, and participating advantages providers may be afforded additional revenue streams for offering advantages.

Identifying Advantages:

The types of advantages most likely to interest users are those that help them gain status, power, provide entertainment, or give rights they would not normally be able to obtain. Advantages, however, may comprise a variety of desired environment features and/or elements. Using these exemplary criteria, environment feature and/or elements providers (e.g. a game designer) can better predict advantages (e.g. providing an extra life within a game) that would be desirable to participating users. For example, in the context of a game, ammunition, resources, information about the game environment, and numerous other items can be quantified by the game designer as suitable advantages that can be created, integrated, and transacted. In other contexts, environment feature and/or element providers can offer features and/or elements that assist participating users to overcome frequently presented challenges.

Creating Advantages:

Once identified, the advantage provider's are charged with the task of creating the advantage for transaction. Generally, there are several requirements that are considered when creating advantages. These requirements include the rights of control over the advantage (i.e. who has the authority to edit, modify, and offer the advantage) and the ability to secure the advantage (i.e. is the advantage feasible legally, ethically, and financially and how will the advantage be accessed). In the context of a game environment advantage, the game designer controls the resources of the game thereby having the ability to create and provide advantages to game participants. In this capacity the advantages offered to participating users may give some control over a game's resources (e.g. ammunition, lives, etc) for a price. The advantage provider can decide the nature and extent of such control based on any number of factors such as cost, purchase history, demographic data, etc. The ability to secure the advantage is also extremely important when creating an advantage. For example, in a non-computing environment advantage example, a city may offer its residents the ability to speed throughout the city in return for the payment of a special "city speed" tax. To realize this advantage, however, the city government should have the ability to 1) enforce the speed limit, and 2) be legally able to authorize driving faster than the speed limit. In this example, the city may show control over the advantage by choosing to limit the availability of the advantage to those drivers whose driving record meets certain requirements.

Integrating Advantages:

Once an advantage is identified and created it is integrated within an environment and coupled to a transaction system for transacting. The integration of advantages depends heavily on the environment in which the advantage is to be offered. For example, if the advantage is to be integrated in a computing environment, the identified and created advantage may be included in the source code of the computing application operating in the environment. Comparatively, if the advantage is to be offered in non-computing environments, the advantage may be integrated within a complimentary product or service that is offered to the participating user. For example, a participating user playing a round of golf may be offered the advantage of having two additional strokes per hole. This advantage may be offered to the user as a feature on the score card that the golf course provides to the participating user to keep score. If the participating user capitalizes on this offered advantage, the golf course would recognize the total score recorded minus two strokes per hole as the "official" score of the participating user. Alternatively, in the case of partial computing environments, advantages may be integrated using a combination of the aforementioned techniques.

An exemplary transaction system for use with integrated advantages may include security to protect the integrity of the transaction and the advantage being transacted and communication means to inform participating users of the availability of an advantage and information regarding the price and description of the advantage. Additionally, this system may track and store participating users' advantages information such as demographic information, buying habits, preferences or tastes. This information is subsequently used to determine the popularity of advantages and to assist in identifying and creating new advantages that can be tailored to participating users' preferences. Further, the exemplary transaction system may include inventory, sales, and tracking information for the various advantages offered and sold. Optionally, the system may include one or more pricing mechanisms that set advantages prices based on a variety of factors. These factors include: participating users' preferences, cost, supply and demand. Further pricing may be realized through auctions and reverse auctions or other methods.

Transacting Advantages:

There are three steps performed when transacting advantages: 1) transaction request, 2) transaction processing, and 3) transaction fulfillment. During the first step a participating user requests a discrete advantage (e.g. ammunition or additional lives). The request is processed by the aforementioned transaction system to determine if the request can be successfully fulfilled. This determination may involve checking the profile and account balance of the requesting participating user to see if they are qualified for the advantage and ensuring the participating user has requested a valid advantage. If the participating user qualifies, the user's account is debited and the requested advantage is provided. The transaction occurs in a real time two-way transaction. For example, a participating user navigating in a computing game environment requests more ammunition. The user is processed and if qualified, received the ammunition immediately—the accounting for which is settled latter. This permits the participating user to continue in their computing game environment (i.e. continue playing the game) without the usual interruption of transaction processing.

As will be described below with respect to FIGS. 1–6, the present invention is directed to a system and methods that enable the procurement and transaction of advantages. In accordance with an illustrative implementation thereof, the present invention comprises a system and methods that couples participating users with advantages providers for the transaction of advantages.

Illustrative Computing Environment

FIG. 1 shows computing system 100 that may support the present invention. Computing system 100 comprises computer 20*a* that may comprise display device 20*a*' and interface and processing unit 20*a*". Computer 20*a* may support computing application 180. As shown, computing application 180 may comprise computing application processing and storage area 180 and computing application display 180*b*. Computing application processing and storage area 180*a* may contain advantages data store 180*a*'. Similarly, computing application display 180*b* may comprise display content 180*b*'. In operation, a user (not shown) may interface with computing application 180 through the use of computer 20*a*. The user (not shown) may navigate through computing application 180 to obtain various advantages. Advantages may be retrieved by computing application 180 from advantages data store 180*a'* of computing application processing and storage area 180*a* and shown to a user (not shown) as display content 180*b'* on computing application display 180*b*. The user (not shown) may choose to purchase certain advantages. Transacted advantages may be stored in advantages data store 180*a'* in user accounts that may be communicated to cooperating advantages content providers (not shown).

Illustrative Computer Network Environment

Figure 1A:
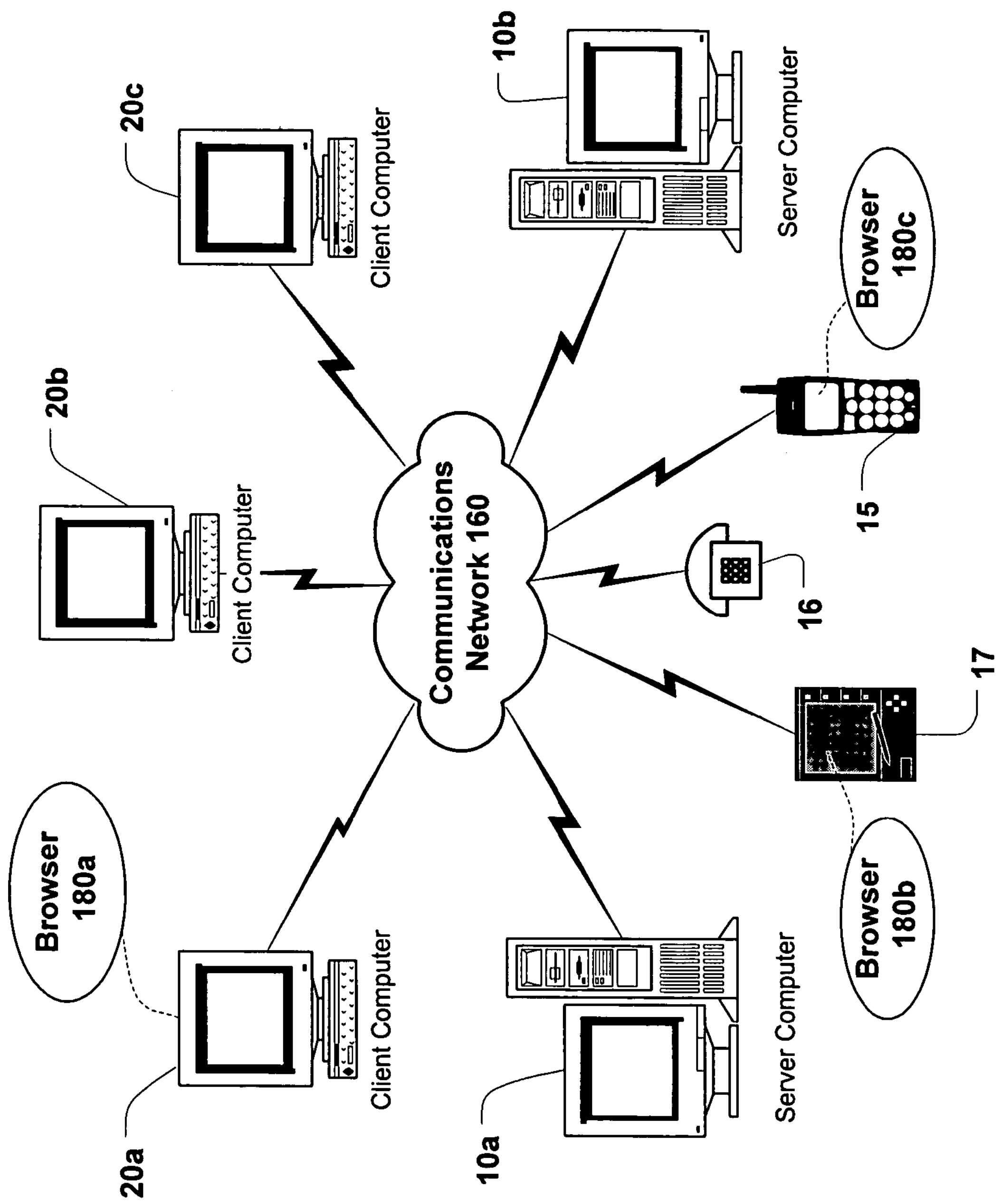
FIG. 1A is a system diagram of an exemplary computing network environment in accordance with the present invention.

Computer 20*a*, described above, can be deployed as part of a computer network. In general, the above description for computers applies to both server computers and client computers deployed in a network environment. FIG. 1A illustrates an exemplary network environment, with a server in communication with client computers via a network, in which the present invention may be employed. As shown in FIG. 1A, a number of servers 10*a*, 10*b*, etc., are interconnected via a communications network 160 (which may be a LAN, WAN, intranet, the Internet, or other computer network) with a number of client computers 20*a*, 20*b*, 20*c*, or computing devices, such as, mobile phone 15, land-line telephone 16, and personal digital assistant 17. In a network environment in which the communications network 160 is the Internet, for example, the servers 10 can be Web servers with which the clients 20 communicate via any of a number of known protocols, such as, hypertext transfer protocol (HTTP) or wireless application protocol (WAP). Each client computer 20 can be equipped with browser 180*a* to gain access to the servers 10. Similarly, personal digital assistant 17 can be equipped with browser 180*b* and mobile phone 15 can be equipped with browser 180*c* to display and receive various data.

In operation, a user (not shown) may interact with a computing application running on a client computing devices to obtain a variety of advantages. The advantages may be stored on server computers and communicated to cooperating users through client computing devices over communications network 160. A user may purchase an advantage by interfacing with computing applications on client computing devices, thereby creating an advantages transaction. These transactions may be communicated by client computing devices to server computers for processing and storage. Server computers may host computing applications for the processing of advantages transactions and advantages data stores for the storage of such transactions.

Thus, the present invention can be utilized in a computer network environment having client computing devices for accessing and interacting with the network and a server computer for interacting with client computers. However, the systems and methods providing the creation, integration, and transaction of advantages and interactive advertisement of the present invention can be implemented with a variety of network-based architectures, and thus should not be limited to the example shown. The present invention will now be described in more detail with reference to a presently illustrative implementation.

Advantages Transaction

Figure 1B:
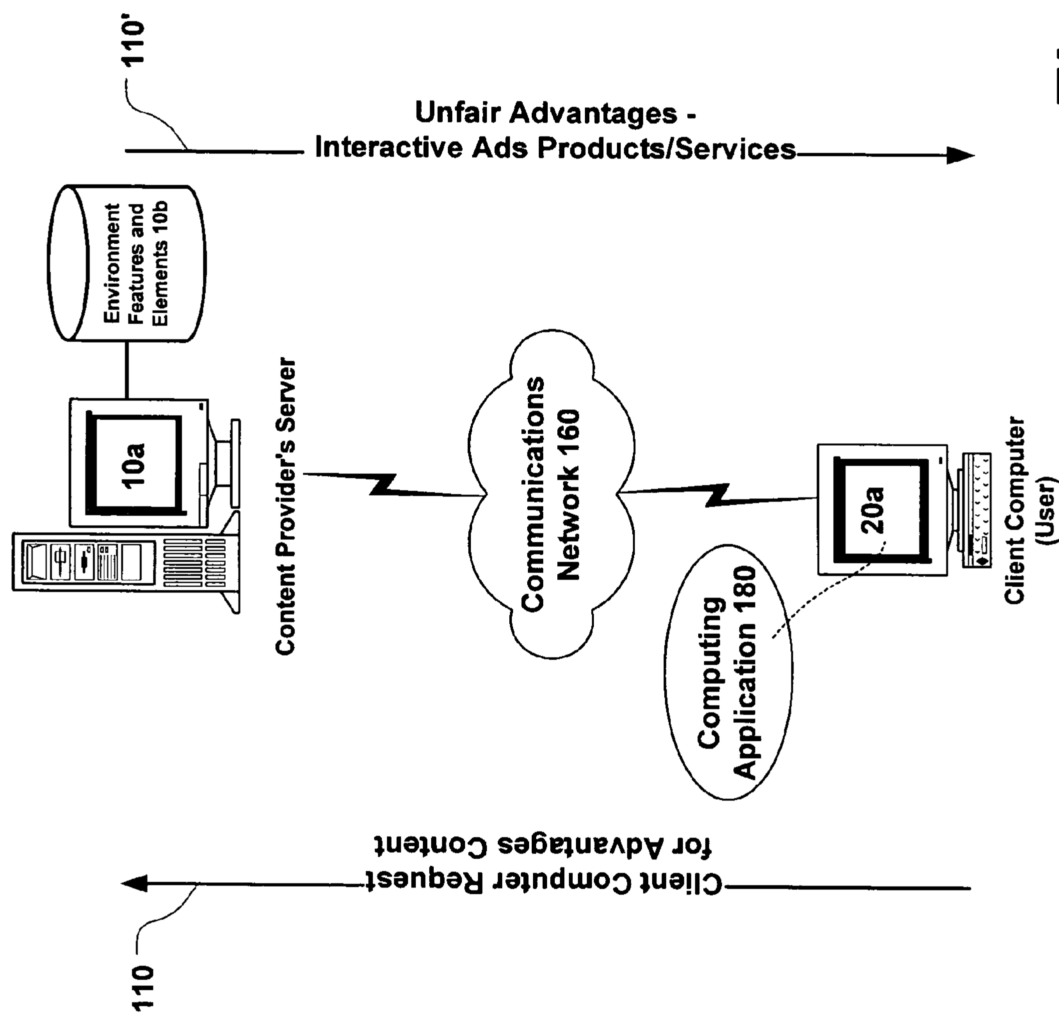
FIG. 1B is a system diagram showing the interaction between exemplary computing components in accordance with the present invention.

FIG. 1B shows the cooperation of various computing elements when transacting advantages and interactive advertisements in a computing environment. A participating user may employ computing application 180*a* operating on client computer 20*a* to send a request for advantages content 110 to content provider's server 10*a* over communications network 160. In response, content provider's server 10*a* may process send the request and retrieve environment features and/or elements (i.e. advantages) content and/or interactive advertisements content from environment features and elements database 10*b* for communication to client computer 20*a* over communications network 160. Further, participating user may employ computing application 180 to communicate requests to purchase advantages or products and services offered by the interactive advertisements. The advantages may be requested by participating users or alternatively may be offered to participating users based on predefined conditions (e.g. a participating user passes a rendition of cellular phone shop in a computing application game and is prompted on whether he/she would like to purchase a cellular phone or, alternatively, if already owning a cellular phone, whether he/she would like to pay their bill).

Figure 2:
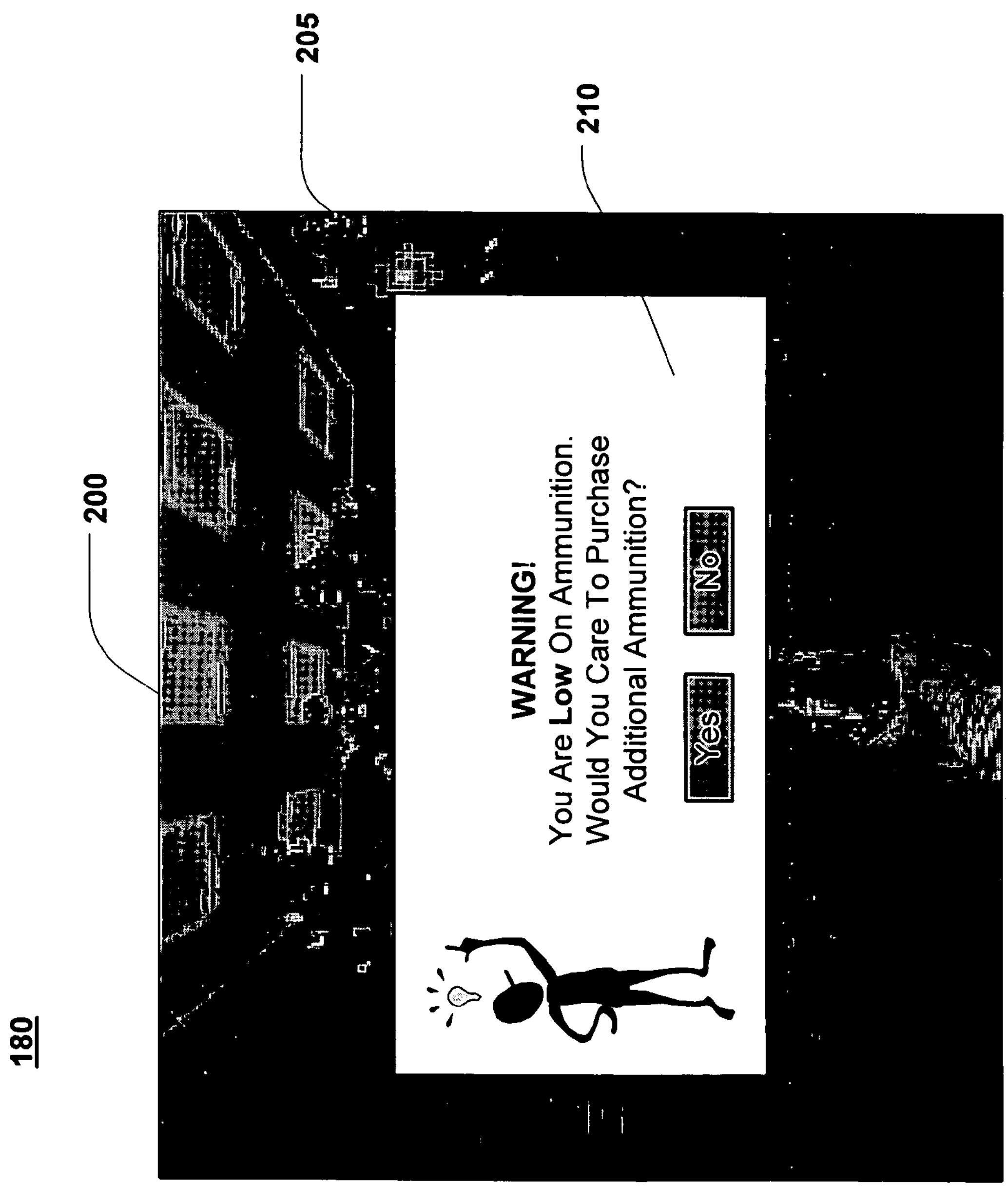
FIG. 2 is a screen shot of an exemplary gaming computing application offering advantages to participating users.

FIGS. 2, 3, 4, and 4A illustrate screen shots that display various features of the advantages and interactive advertisements system. As shown in FIG. 2, the advantages and interactive advertisements system of the present invention may be incorporated in computing application 180 displaying an interactive game through gaming pane 200. Gaming pane 200 may comprise gaming content 205 and advantages dialog box 210. In operation, a user may be prompted by gaming computing application to secure a variety of advantages. In the example shown, dialog box 210 may warn the user that he/she is low in ammunition in the interactive search and destroy game 205 that is being navigated. A user may choose to purchase additional ammunition and proceed, or alternatively, proceed without securing any advantages. Conventionally, this advantage would not be offered to gamers. Rather, gamers would be forced to proceed with low ammunition using skill to advance in the game. Typically, gamers would proceed with low ammunition only to be defeated. The user maybe relegated to start the game from the very beginning, rendering all of his/her invested time moot.

Figure 3:
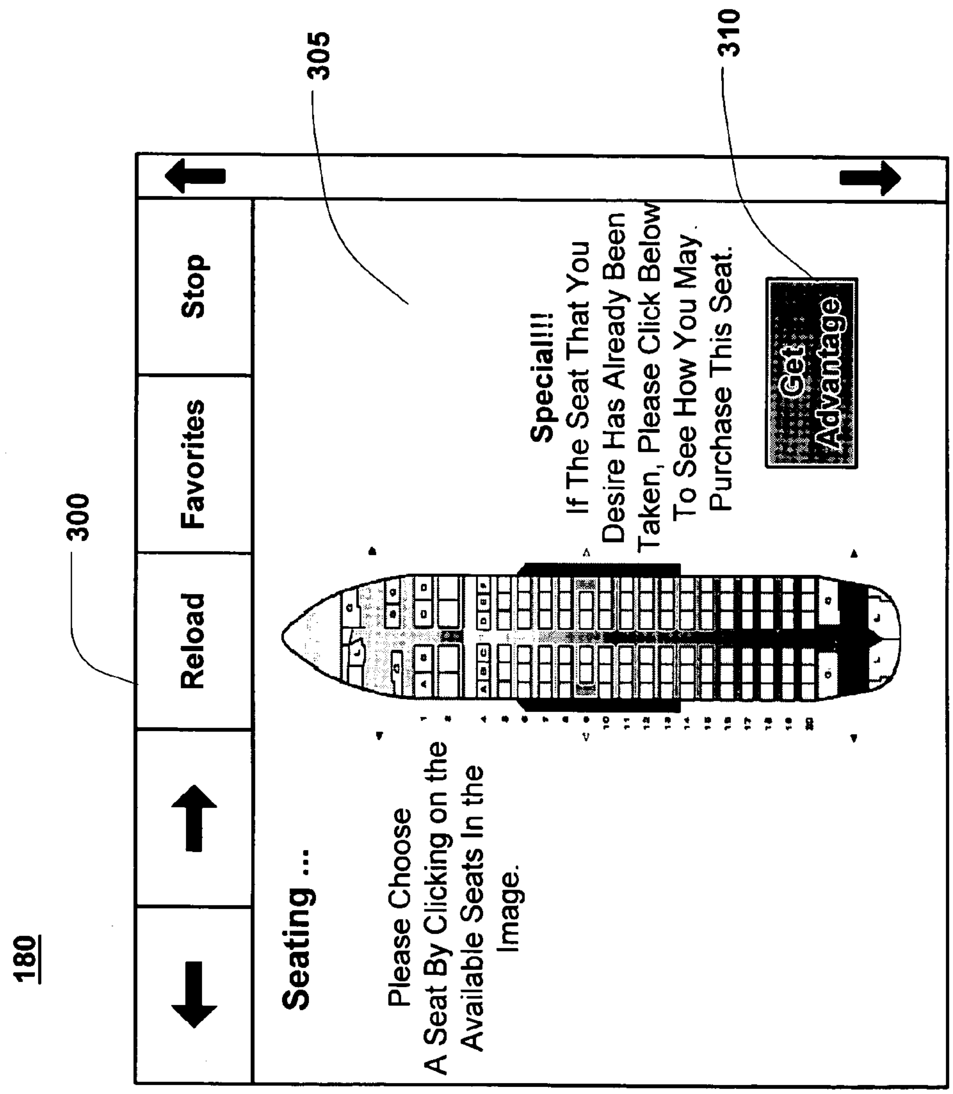
FIG. 3 is a screen shot of an exemplary Internet based computing application offering advantages to participating users.

FIG. 3 shows computing application 180 supporting a Web browser computing application having Internet content display pane 300. Internet content display pane 300 may comprise Internet content 305 and controls 310. In the example shown, the advantages and interactive advertisement system of the present invention may be employed by an airline content provider providing content over the Internet. As part of their Internet content 305, airlines may request users to choose a seat for their travel. In the event a preferred seat has been already reserved, the user may be prompted by the Internet computing application to purchase an advantage to obtain the desired seat. The user may proceed to purchase this advantage by navigating controls 310.

Figure 4:
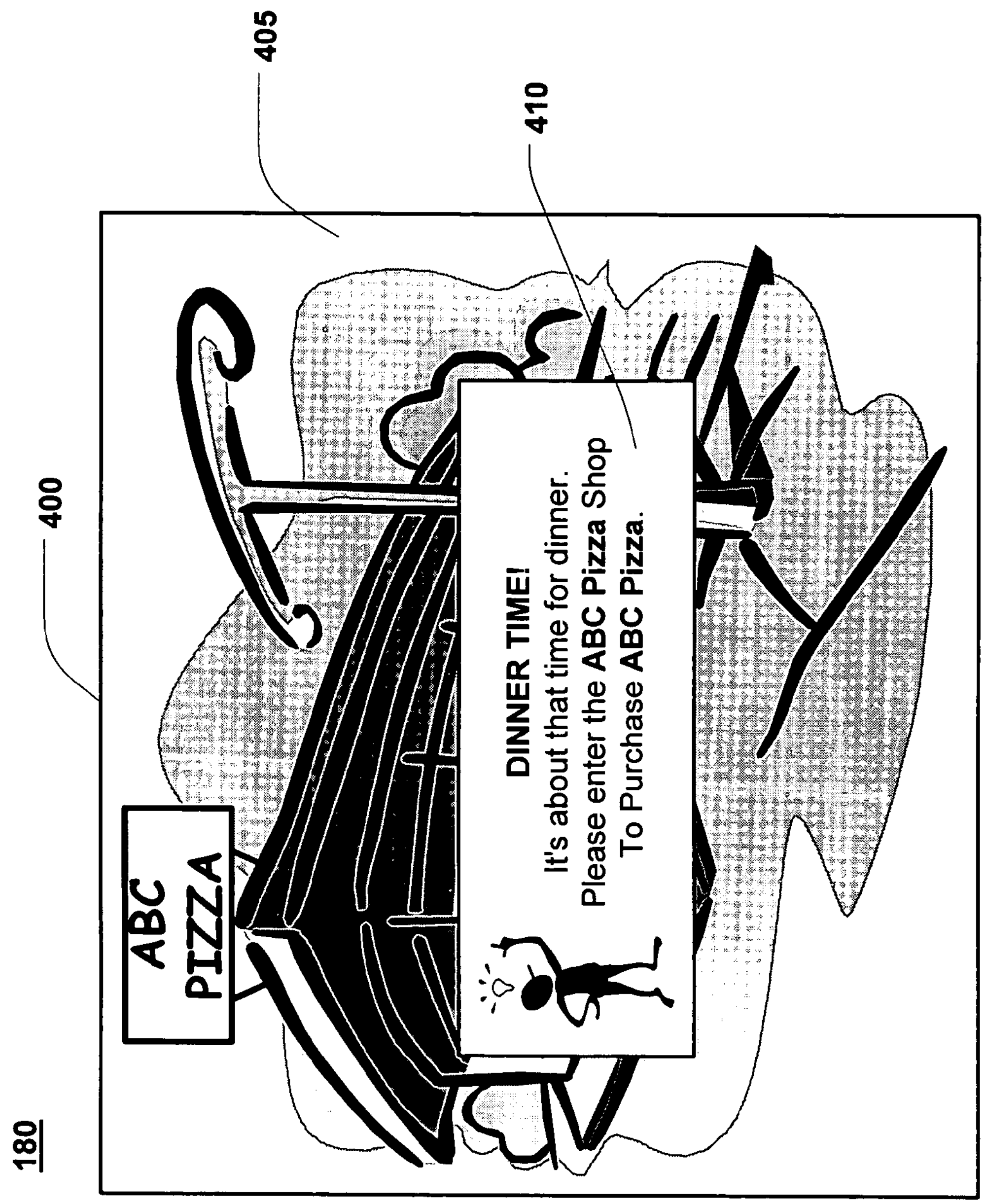
FIG. 4 is a screen shot of an exemplary computing simulation application offering interactive advertisements to participating users.

Alternatively, the present invention may offer users interactive advertisements by which users can purchase a variety of products or services. These advertisements may be integrated within a number of computing applications in accordance to the context of the computing application. For example, in a simulation role playing game, real world products and/or services advertisements may be integrated in the game's landscape such that a user may interact with the cyber world advertisements to transact real world products and/or services. As shown in FIG. 4, the present invention may be employed by computing application 180 supporting a cyber environment having display pane 400. Display pane 400 may comprise interactive content 405 and interactive content dialog box 410. In operation, a user may be engrossed in a role playing computing application game for hours not realizing that the dinner hour is soon upon him/her. In the game, the user may be required to navigate through city streets and neighborhoods having storefronts and other real world constructs. As the user passes by a cyber realm storefront, ABC Pizza, dialog box 410 may appear to the user of computing application 180 providing a friendly reminder that dinner time is approaching. The user may proceed to enter the store in the cyber world and place an order for a real world pizza. The system of the present invention would communicate the order to the appropriate parties and the real world product would be delivered to the user. The user is now given the ability to transact real world products through the cyber realm storefront.

Figure 4A:
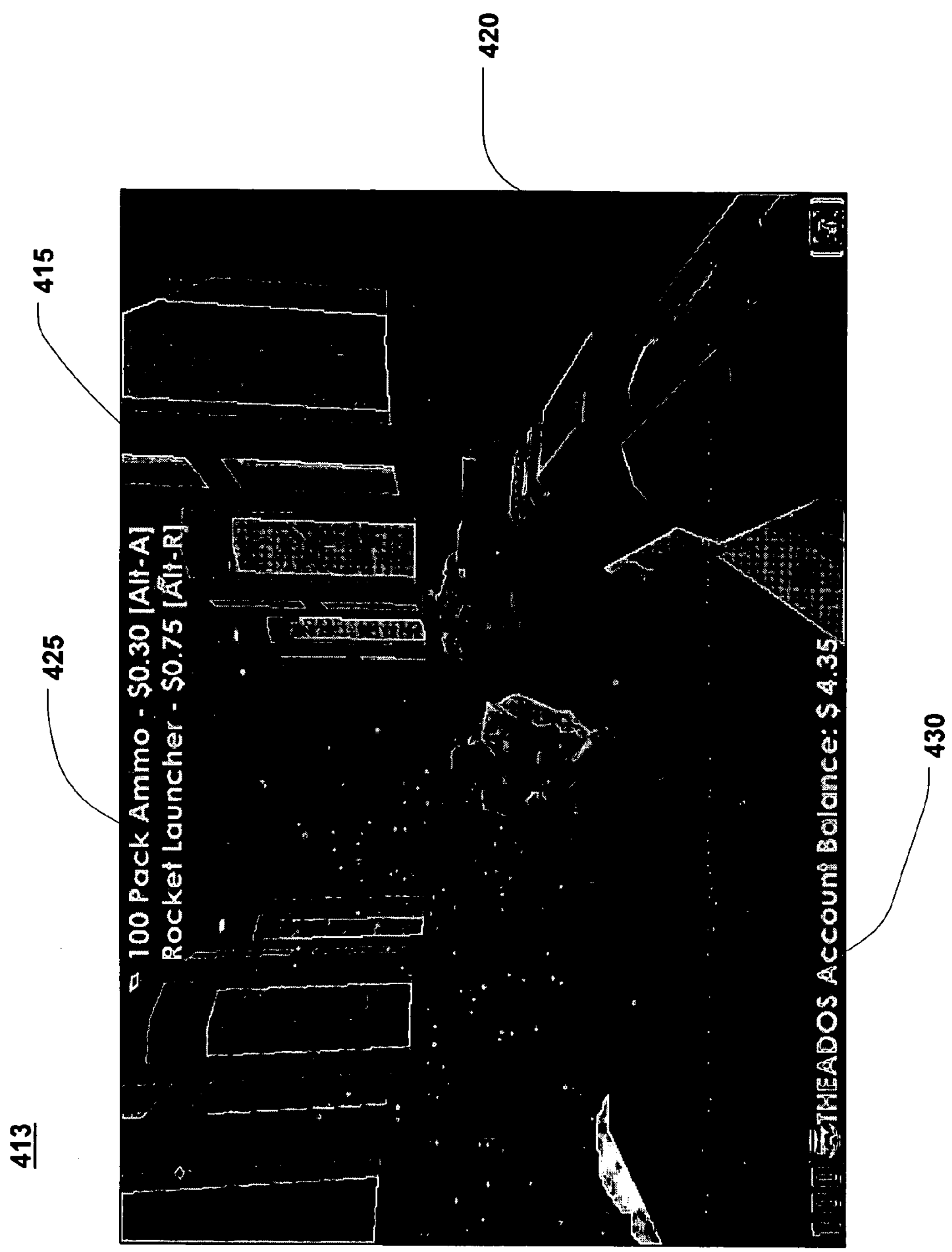
FIG. 4A is a screen shot of an exemplary computing simulation application showing the real-time transaction in accordance with the present invention.

FIG. 4A shows a screen shot of an exemplary computing simulation application 413 describing the integration and real-time transaction features of the present invention. As shown, screen shot 415 comprises simulation content 420, advantages information 325, and transaction information 430. In operation, a participating user may operate computing simulation application 413 to interact with simulation content 420. Computing simulation application 415 may be configured that is has access to advantages content provider computer server 10*a* (of FIG. 2) such that advantages may be offered through computing application 413 to the participating user while interacting with computing application 413. In the example shown, the game is directed to a "shot-em up" type game where the participating user is called upon to slay unworldly beasts using a variety of weaponry. As the participating user runs low on ammunition (or some other condition), advantages information 425 is displayed to offer advantages to the participating user. As such, the advantage is integrated into computing application 413. Advantages information 425 comprises information about the advantage and the cost of the advantage. In addition to the advantages information 425, transaction information 430 is offered to the participating user to inform him/her of their outstanding balance. The participating user may elect to accept the offered advantage, using advantages information 425 and transaction information 430 to help him/her in their decision, to enhance his/her interaction with computing application 413.

Figure 5:
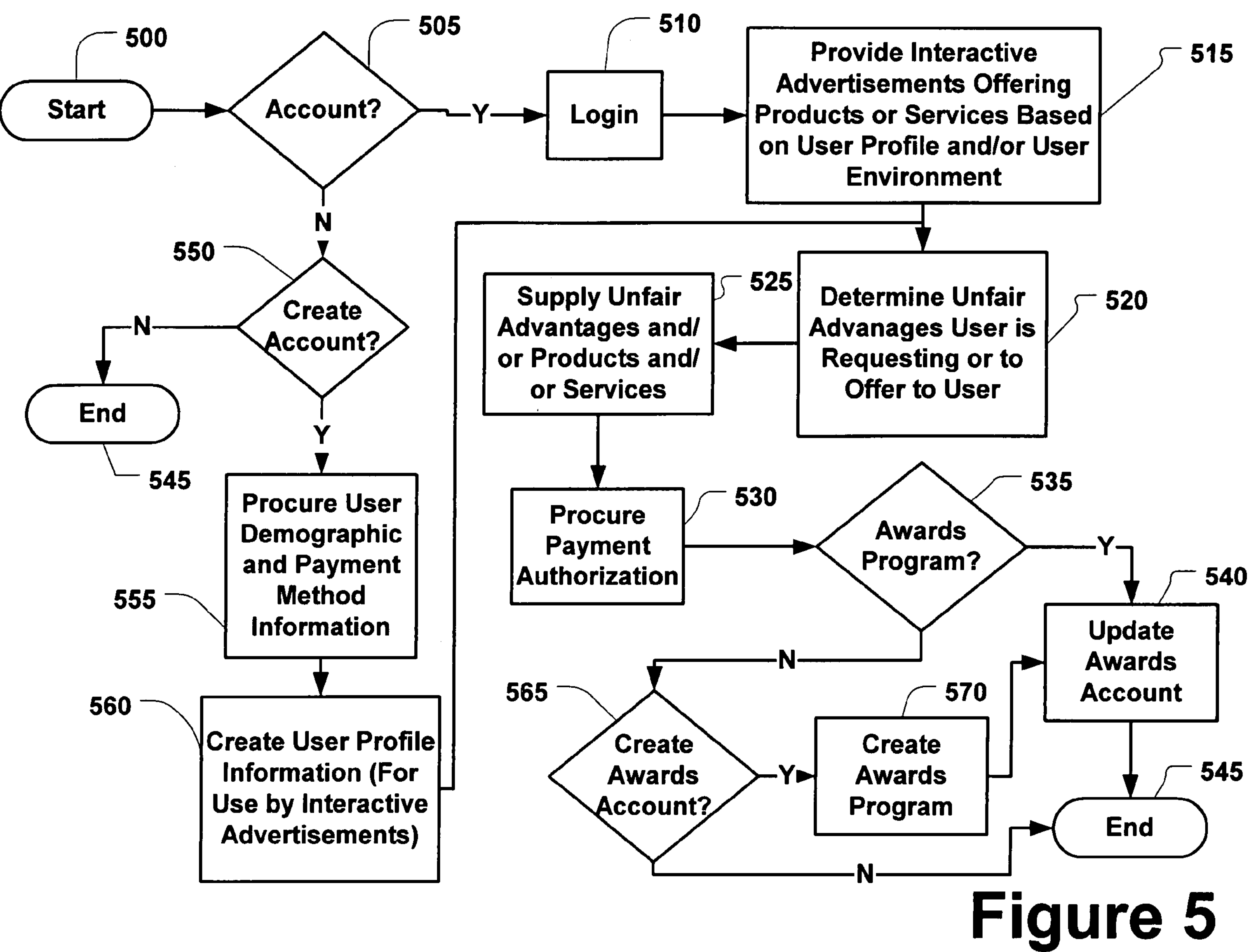
FIG. 5 is flow diagram of the processing performed by present invention to create and transact advantages.

FIG. 5 describes the general processing performed by the advantages and interactive advertisements system and methods. Processing beings at block 500 and proceeds to block 505 where a check is performed to determine if the participating user has an account to purchase advantages or transact interactive advertisements. If the user has an account, he/she is prompted to login at block 510. Interactive advertisements are then offered to the user at block 515. From there, a determination of the advantages and/or desired products and services (as requested in the cyber realm) is made at block 520 to ascertain those advantages to offer to the user, or to provide to the user based on their request. The advantages and/or products and services are supplied to the user at block 525. Payment authorization is then made at block 530. Using the present invention, participating users have the ability to "purchase" these environment features and/or elements, products, and services using various currency means, including credit cards, e-cash, e-gold, other Internet enabled currency, and secondary monetary sources, such as, charges to phone or utility bill, transferring credit on pre-paid phone cards, or transit passes, or through conventional payment methods, such as checks, money-orders or cash. A check is then made at block 535 to determine if the participating user has an awards account. The awards account is established for frequent users to provide advantages and/or products and services at a discounted rate. This promotes the use the present system and maintains user loyalty. If the user has an awards account at block 535, the awards account is updated at block 540 and processing ends at block 545. If, however, the user does not have an awards account, he/she is prompted at block 565 to see if the user would like to create an awards account. If the user wants an awards account at block 565, an account is created at block 570 and processing proceeds therefrom.

Alternatively, if at block 505, it is determined that the user does not have an account to transact advantages and/or purchase through interactive advertisements, the user is queried to create an account at block 550. If the user does not want an account processing proceeds to block 545 and ends. However, if the alternative proves to be true, processing proceeds to block 555 where user demographic and payment information is procured. A user profile is then created at block 560 and processing jumps to block 515 and proceeds therefrom. The profile information may be used by the system to tailor advertisement offerings to participating users, such that products and service offerings are consistent with the user's profile information.

Figure 6:
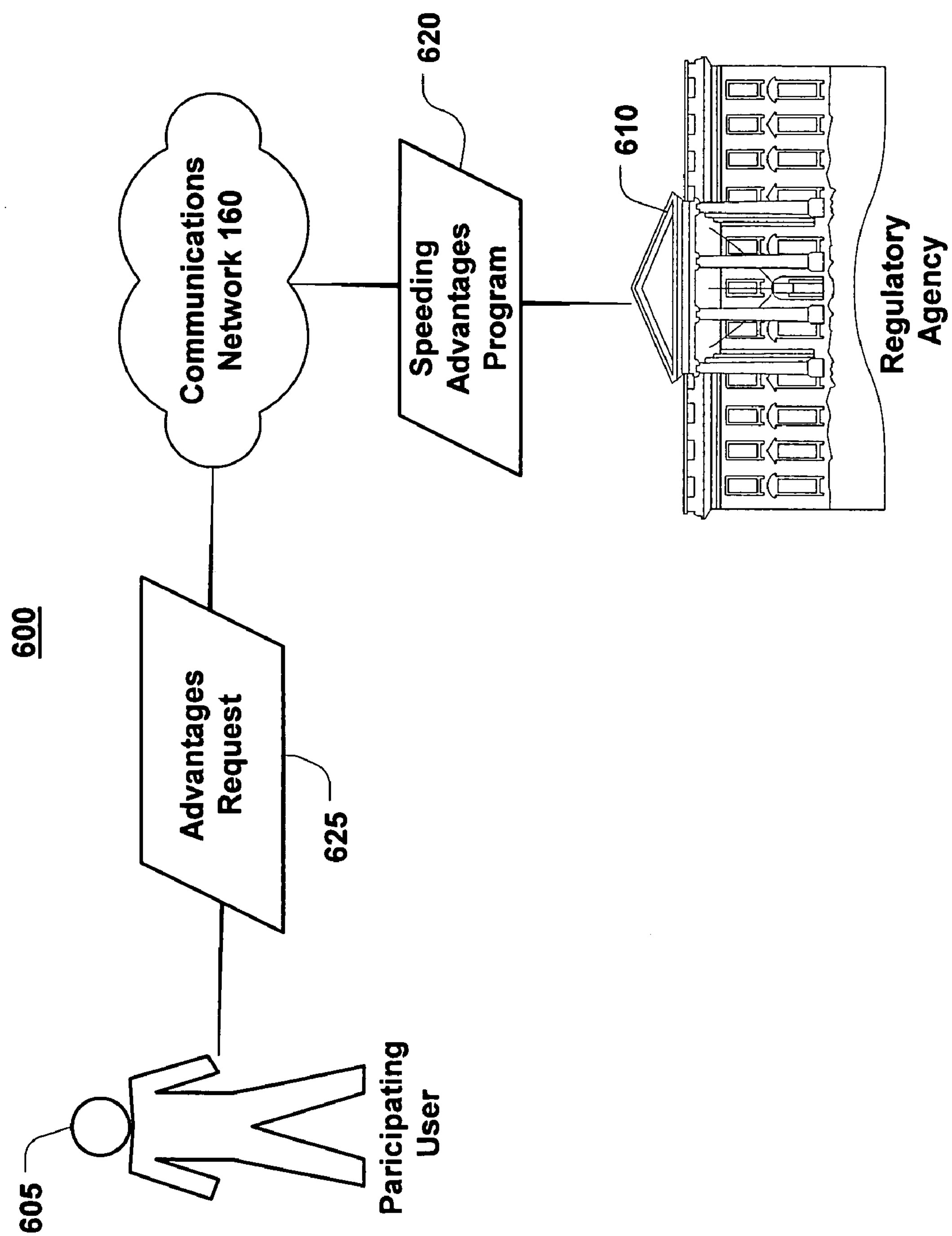
FIG. 6 is a block diagram showing the interaction among various parties to realize a real-world implementation of advantages transaction in accordance with the present invention.

FIG. 6 depicts a real-world implementation of the advantages procurement and transaction system and methods of the present invention. Real-world environment advantages procurement and transaction system 600 is shown comprising participating user 605, communications network 160 and advantages provider 610. In an illustrative implementation, the advantages provider 610 may comprise a regulatory agency providing a set of defined advantages. In operation, real-world environment advantages procurement and advantages system 600 may afford participating user 605 the ability to submit advantages request 635 to advantages provider 610 over communications network 160. In turn, advantages provider may satisfy advantages request 625 by providing advantages 620 over communications network 160.

In the example shown, the regulatory agency may offer a speeding advantages program 620 to participating users 605. The speeding advantages program contemplated would offer participating users 605 the ability to drive in excess of posted speed limits upon the payment of fee. The participating user, in effect, would be offered exemptions from speeding tickets if caught speeding within the limits of the offered speeding advantages program. In operation, participating user 605 may request and transact advantages by submitting advantages request 625 to regulatory agency 610 over communications network 160 of real-world advantages procurement and transaction system 600. In turn, regulatory agency 610 may subscribe participating user 605 to the speeding advantages program 620 employing communications network 160 to relay the subscription and payment process.

Advertisement Advantages

The present invention also contemplates an alternative embodiment where the participating user is an advertiser. In an illustrative implementation, the advertiser of products and services in computing environments, such as, interactive TV, online movies, streaming media, or video clips, may obtain advantages over their competitors, such as better placement of advertisements in the computing environment for their products and/or services. In doing so, the advantage using advertisers can better target and reach a larger audience. These participating users (i.e. advertisers) are charged for the advertisement advantage much like other advantages users according to the pricing, charging, and billing techniques described above.

CONCLUSION

In sum, the present invention provides system and methods to create, integrate, and transact advantages. It is understood, however, that the invention is susceptible to various modifications and alternative constructions. There is no intention to limit the invention to the specific constructions described herein. On the contrary, the invention is intended to cover all modifications, alternative constructions, and equivalents falling within the scope and spirit of the invention.

It should also be noted that the present invention may be implemented in a variety of computer environments (including both non-wireless and wireless computer environments), partial computing environments, and real world environments. The various techniques described herein may be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system may also be considered to be implemented as a computer-readable storage medium, configured with a computer program, where the storage medium so configured causes a computer to operate in a specific and predefined manner.

Although an exemplary implementation of the invention has been described in detail above, those skilled in the art will readily appreciate that many additional modifications are possible in the exemplary embodiments without materially departing from the novel teachings and advantages of the invention. Accordingly, these and all such modifications are intended to be included within the scope of this invention. The invention may be better defined by the following exemplary claims.

What is claimed is:

1. A method of managing the operation of a game which includes a game environment, and is programmed to control a gaming action for at least one of a plurality of users, said managing method using a programmed computer to effect the following steps:

a) tracking the activity of the at least one user in the course of the gaming action;

b) permitting the at least one user to create an account for receiving a consideration of the at least one user, the at least one user having a set of demographics;

c) determining the eligibility of the at least one user to purchase at least one of a plurality of game objects, said eligibility determining comprises the following sub steps:

i) permitting the at least one user to select the at least one game object, ii) setting the purchase price of the at least one game object, and iii) comparing the account balance of the at least one user's consideration with the set price of the at least one game object and, determining if the balance of the user's consideration is not less than the set price, determining the at least one user to be eligible to purchase the at least one game object;

d) displaying in the game environment a purchase price of the at least one game object;

e) presenting to the at least one user an offer to purchase the game object dependent upon a group of game parameters comprising the tracked activity of the at least one gaming action of the at least one user and, the one game environment or the one set of demographics of the least one user f) permitting the at least one user to purchase the at least one game object at the set purchase price without interrupting the gaming action of the at least one user; and g) supplying the at least one purchased game object to the at least one user without interrupting the gaming action of the at least one user and incorporating the game object into the game.

2. The method of claim 1, wherein the gaming environment comprises a video game that generates a series of background images, and the at least one selected game object is directed to act in accordance with the gaming action of the at least one user throughout the series of background images.

3. The method of claim 2, wherein the at least selected one game object comprises the at least one of a plurality of player images, and the at least one background image is selected from a group comprising of at least one action game, one adventure game, and/or one role-playing game.

4. The method of claim 2, wherein the at least one background image is selected from a group comprising at least one of a plurality of battlefields, one action image, one military image, one adventure image, one sports image, one board game image, one role-play, one strategy game image, one cyber world image, one real world image, and/or one airline image.

5. The method of claim 1, wherein the at least one game object comprises at least one of a plurality of elements and the at least one user is able to set at least one of a plurality of attributes of the at least one element and to direct the at least one element to move throughout the at least one background image.

6. The method of claim 5, wherein the at least one attribute is selected by the at least one user from a group comprising at least one of a plurality of levels of skill, one size of ammunition, one rate of speed, one length of life, one piece of information about the game environment, one degree of access, and/or one type of weapon.

7. The method of clam 1, wherein the at least one game object comprises at least one of a plurality of elements, the at least one element to be selected from a group comprising at least one of a plurality of ammunitions, one weaponry, one skill, one access, and/or one life.

8. The method of claim 1, wherein the game environment includes at least one of a plurality of pieces of information describing the game environment, and permitting the at least one user to determine the at least one piece of information.

9. The method of claim 1, wherein the gaming action comprises the at least one user and the at least one game object that is programmed to give an advantage to the at least one user.

10. The method of claim 1, wherein the gaming action is selected from a group comprising at least one of a plurality of fighting engagements on a battlefield, one fighting engagement using weaponry, one engagement in a sport, at least one marketing of pizza, at least one user playing a role in a game environment, and/or at least one user firing a weapon.

11. The method of claim 1, wherein the game is selected from a group comprising of at least one of a plurality of virtual games, at least one video game, at least one of feature representation, at least one of appearance, at least one characteristic, at least one trait, and/or at least one file.

12. The method of claim 1, wherein the game object is selected from a group comprising at least one of a plurality of weapons, at least one ammunition, at least one skill, at least one access, at least one life, at least one piece of information about the game environment, at least one pizza, at least one cell phone, at least one ability to speed, and/or at least one preferred seat.

13. The method of claim 1, wherein the step of supplying provides to the one user the selected one of a plurality of game objects that will provide an advantage to the at least one user.

14. The method of claim 1, wherein the consideration is selected from the group comprising at least one of a plurality of credit cards, one e-cash, one e-gold, and one internet enabled currency, one secondary monetary source, one charge to a phone and/or a utility bill, transferring of a check, one money order, and/or one amount of cash.

15. A method of managing the operation of a game which includes a game environment, and is programmed to control a gaming action of at least one of a plurality of users, said managing method using a programmed computer to effect the following steps:

a) tracking the activity of the at least one user in the course of the gaming action;

b) creating an account for the at least one user for maintaining a balance of the at least one user;

c) enabling the at least one user to select at least one of a plurality of game objects;

d) setting the purchase price of the at least one game object;

e) comparing the account balance with the set price of the at least one game object and, determining if the user's account balance is not less than the set price, then the at least one user is eligible to purchase the one selected game object;

f) presenting to the at least one user an offer to purchase the game object dependent upon a group of game parameters comprising the tracked activity of the at least one user, and an indication of whether the at least one user has made a commitment of consideration to purchase the one selected game object;

g) ordering the at least one selected game object without interrupting the gaming action of the at least one user; and h) supplying the selected one game object to the at least one user without interruption of the gaming action of the at least one user and incorporating the game object into the game.

16. The method of claim 15, wherein there is included the further step of offering to the at least one user an option to purchase the at least one game object dependent upon the group or game parameters comprising further the gaming action of the at least one user, the game environment, and/or the demographics of the at least one user.

17. A method of managing the operation of a game which includes a game environment and is programmed to control a gaming action of at least one of a plurality of users, said managing method using a programmed computer to effect the following steps:

a) tracking the activity of the at least one user in the course of the gaming action;

b) displaying in the game environment a plurality of game objects;

c) creating an account for storing the consideration of the at least one user;

d) permitting the at least one user to select one or more of the plurality of the displayed game objects, each game object having a set price;

e) determining if the at least one user has sufficient consideration in its account to purchase the selected one game object and to provide an indication thereof;

f) presenting to the at least one user an offer to purchase the game object dependent upon a group of game parameters comprising the tracked activity of the at least one user, and the indication that the one user has sufficient consideration in its account to purchase the selected game object at the set price;

g) permitting the at least one user to purchase the at least one game object at the set price without interrupting the gaming action of the one user; and h) supplying at least one purchased game object to the at least one user without interrupting the gaming action of the at least one user and incorporating the game object into the game.

18. A method of claim 17, wherein there is included the further steps of:

a) testing the eligibility of the at least one user to participate in the gaming action; and b) said eligibility testing comprises the following sub steps:

i) permitting the at least one user to select at least one of a plurality of game objects, ii) setting the purchase price of the at least one game object, and iii) comparing the committed consideration with the set price of the at least one game object and, if the committed consideration is not less than the set price, permitting the at least one user to participate in the gaming action.

19. The method of claim 18, wherein the at least one user has a set of demographics, and there is included the further step of offering to the at least one user an option to purchase the at least one game object dependent upon the group of game parameters further comprising at least one of the plurality of game environments, and/or at least one set of the demographics of the at least one user.

* * * * *